US008862828B2

(12) United States Patent
Saraf et al.

(10) Patent No.: US 8,862,828 B2
(45) Date of Patent: Oct. 14, 2014

(54) SUB-NUMA CLUSTERING (75) Inventors: Ravindra P. Saraf, Austin, TX (US); Rahul Pal, Karnataka (IN); Ashok Jagannathan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 64 days.

(21) Appl. No.: 13/584,656

(22) Filed: Aug. 13, 2012

(65) Prior Publication Data

US 2014/0006715 A1 Jan. 2, 2014

(30) Foreign Application Priority Data

Jun. 28, 2012 (IN) .......................... 2569/CHE/2012

(51) Int. Cl.
*G06F 12/08* (2006.01)
(52) U.S. Cl.
USPC ........................ 711/129; 711/3; 711/E12.046
(58) Field of Classification Search
None
See application file for complete search history.

(56) References Cited

U.S. PATENT DOCUMENTS

| | | | | |
|---|---|---|---|---|
| 6,115,790 | A * | 9/2000 | Schimmel ...................... | 711/119 |
| 6,542,966 | B1 * | 4/2003 | Crawford et al. ............. | 711/133 |
| 7,055,007 | B2 * | 5/2006 | Flautner et al. ............... | 711/156 |
| 8,037,476 | B1 * | 10/2011 | Shavit et al. ................... | 711/150 |
| 8,108,610 | B1 * | 1/2012 | Glasco et al. ................. | 711/118 |
| 8,219,996 | B1 * | 7/2012 | Morris ........................... | 711/128 |
| 8,261,024 | B1 * | 9/2012 | Shavit et al. ................... | 711/147 |
| 8,429,656 | B1 * | 4/2013 | Duluk et al. ................... | 712/22 |
| 2002/0046324 | A1 * | 4/2002 | Barroso et al. ................ | 711/122 |
| 2004/0226026 | A1 * | 11/2004 | Glass et al. .................... | 719/328 |
| 2006/0004796 | A1 * | 1/2006 | Nakamura ...................... | 707/100 |
| 2006/0206635 | A1 * | 9/2006 | Alexander et al. ............. | 710/22 |
| 2007/0156964 | A1 * | 7/2007 | Sistla ............................. | 711/133 |
| 2008/0022261 | A1 * | 1/2008 | Gooding ........................ | 717/124 |
| 2008/0126750 | A1 * | 5/2008 | Sistla .............................. | 712/30 |
| 2009/0049248 | A1 * | 2/2009 | Clark et al. .................... | 711/129 |
| 2009/0089470 | A1 * | 4/2009 | van de Ven .................... | 710/260 |
| 2009/0193064 | A1 * | 7/2009 | Chen et al. ..................... | 707/204 |
| 2009/0265514 | A1 * | 10/2009 | Biles et al. ..................... | 711/154 |
| 2010/0257316 | A1 * | 10/2010 | Arimilli et al. ................ | 711/119 |
| 2011/0087840 | A1 * | 4/2011 | Glasco et al. .................. | 711/118 |
| 2011/0119397 | A1 * | 5/2011 | Evans et al. .................... | 709/235 |
| 2011/0153936 | A1 * | 6/2011 | Starke ............................ | 711/118 |
| 2011/0173394 | A1 * | 7/2011 | Gara et al. ..................... | 711/125 |
| 2011/0179199 | A1 * | 7/2011 | Chen et al. ...................... | 710/28 |
| 2011/0219208 | A1 * | 9/2011 | Asaad et al. ...................... | 712/12 |
| 2011/0252216 | A1 * | 10/2011 | Ylonen et al. ................. | 711/170 |
| 2011/0296406 | A1 * | 12/2011 | Bhandari et al. .............. | 711/130 |
| 2013/0073811 | A1 * | 3/2013 | Beckmann et al. ............ | 711/141 |
| 2013/0085999 | A1 * | 4/2013 | Tung et al. ..................... | 707/654 |
| 2013/0311724 | A1 * | 11/2013 | Walker et al. .................. | 711/136 |

OTHER PUBLICATIONS

Tam, David. "Operating System Management of Shared Caches on Multicore Processors." U. of Toronto, 2010.*

* cited by examiner

*Primary Examiner* — Matthew Bradley
*Assistant Examiner* — Daniel Bernard
(74) *Attorney, Agent, or Firm* — Kenyon & Kenyon, LLP (57) ABSTRACT

Method and apparatus to efficiently store and cache data. Cores of a processor and cache slices co-located with the cores may be grouped into a cluster. A memory space may be partitioned into address regions. The cluster may be associated with an address region from the address regions. Each memory address of the address region may be mapped to one or more of the cache slices grouped into the cluster. A cache access from one or more of the cores grouped into the cluster may be biased to the address region based on the association of the cluster with the address region.

32 Claims, 7 Drawing Sheets

SUB-NUMA CLUSTERING

RELATED APPLICATIONS

This application claims priority to Indian Patent Application No. 2569/CHE/2012 filed Jun. 28, 2012; the contents of which are hereby incorporated by reference in its entirety.

FIELD OF THE INVENTION

The present disclosure pertains to the field of processors and, in particular, to optimizing cache/storage management techniques.

DESCRIPTION OF RELATED ART

Advances in semi-conductor processing and logic design have permitted an increase in the amount of logic that may be present on integrated circuit devices. As a result, computer system configurations have evolved from a single or multiple integrated circuits in a system to multiple cores, multiple hardware threads, and multiple logical processors present on individual integrated circuits. A processor or integrated circuit typically comprises a single physical processor die, where the processor die may include any number of cores, hardware threads, or logical processors. The ever increasing number of processing elements—cores, hardware threads, and logical processors—on integrated circuits enables more tasks to be accomplished in parallel. However, the execution of more threads and tasks put an increased premium on shared resources, such as memory/cache and the management thereof.

Traditional chip multiprocessor (CMP) architectures incorporate a shared and distributed cache structure. Cache slices of a cache may be co-located with cores on a CMP. All cores on a CMP usually have access to all cache slices on the CMP. Thus, the time required by a core to access data from a cache slice depends on the distance between the core and the location of the cache slice where the data resides. Consequently, as the number of cores on a CMP increases, the average distance between cores and cache slices increases, which results in higher latency during cache access. Thus, there is a need to efficiently manage stored/cached data.

DESCRIPTION OF THE FIGURES

Embodiments are illustrated by way of example and not limitation in the Figures of the accompanying drawings.

DETAILED DESCRIPTION

In the following description, numerous specific details are set forth such as examples of specific hardware structures for storing/caching data, as well as placement of such hardware structures; specific processor units/logic, specific examples of processing elements, etc. in order to provide a thorough understanding of the present invention. It will be apparent, however, to one skilled in the art that these specific details need not be employed to practice the present invention. In other instances, well known components or methods, such as specific counter circuits, alternative multi-core and multi-threaded processor architectures, specific uncore logic, specific memory controller logic, specific cache implementations, specific cache coherency protocols, specific cache algorithms, and specific operational details of microprocessors, have not been described in detail in order to avoid unnecessarily obscuring the present invention.

Embodiments may be discussed herein which efficiently store and cache data. In an embodiment, cores of a processor and cache slices co-located with the cores may be grouped into a cluster. A memory space may be partitioned into address regions. The cluster may be associated with an address region from the address regions. Each memory address of the address region may be mapped to one or more of the cache slices grouped into the cluster. A cache access from one or more of the cores grouped into the cluster may be biased to the address region based on the association of the cluster with the address region.

In an embodiment, data required by a core grouped into the cluster may be stored in the address region associated with the cluster. In an embodiment, data required by a core grouped into the cluster may be stored in an address region associated with a second cluster. The second cluster may be a cluster physically closest to the cluster. In an embodiment, the address region may include a contiguous block of memory space. In an embodiment, each memory address of the address region may be evenly hashed across the cache slices grouped into the cluster. In an embodiment, one or more memory controllers may be assigned to the address region. The one or more memory controllers assigned to the address region may manage data flow to and from the address region. The one or more memory controllers may include a memory controller physically closest to the address region. In an embodiment, the cluster may be visible to an operating system as a non-uniform memory access (NUMA) node.

Figure 1:
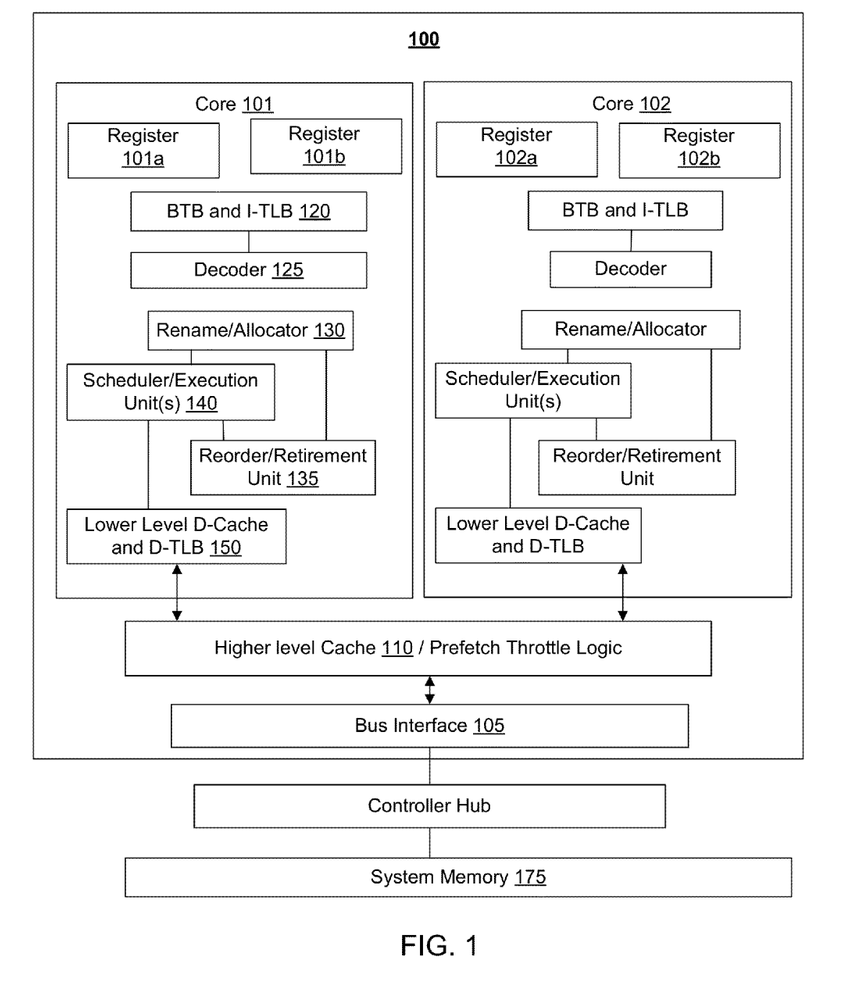
FIG. 1 illustrates a processor including multiple processing elements according to an embodiment.

Referring to FIG. 1, an embodiment of a processor including multiple cores is illustrated. Processor 100, in one embodiment, includes one or more caches. Processor 100 includes any processor, such as a micro-processor, an embedded processor, a digital signal processor (DSP), a network processor, or other device to execute code. Processor 100, as illustrated, includes a plurality of processing elements.

In one embodiment, a processing element refers to a thread unit, a thread slot, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core hopping may be utilized to alleviate thermal conditions on one part of a processor. However, hopping from core 101 to 102 may potentially create the same thermal conditions on core 102 that existed on core 101, while incurring the cost of a core hop. Therefore, in one embodiment, processor 100 includes any number of cores that may utilize core hopping. Furthermore, power management hardware included in processor 100 may be capable of placing individual units and/or cores into low power states to save power. Here, in one embodiment, processor 100 provides hardware to assist in low power state selection for these individual units and/or cores.

Although processor 100 may include asymmetric cores, i.e. cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e. four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. Other smaller resources, such as instruction pointers and renaming logic in rename allocater logic 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register, low level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, processor 100 includes a branch target buffer 120 to predict branches to be executed/taken and an instruction-translation buffer (I-TLB) 120 to store address translation entries for instructions.

Processor 100 further includes decode module 125 is coupled to fetch unit 120 to decode fetched elements. In one embodiment, processor 100 is associated with an Instruction Set Architecture (ISA), which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

As depicted, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoder 125 to store recently decoded traces.

Note, in the depicted configuration that processor 100 also includes bus interface module 105 to communicate with devices external to processor 100, such as system memory 175, a chipset, a northbridge, or other integrated circuit. Memory 175 may be dedicated to processor 100 or shared with other devices in a system. Common examples of types of memory 175 include dynamic random access memory (DRAM), static RAM (SRAM), non-volatile memory (NV memory), and other known storage devices.

FIG. 1 illustrates an abstracted, logical view of an exemplary processor with a representation of different modules, units, and/or logic. However, note that a processor utilizing the methods and apparatus' described herein need not include the illustrated units. And, the processor may omit some or all of the units shown. To illustrate the potential for a different configuration, the discussion now turns to FIG. 2, which depicts an embodiment of processor 200 including an on-processor memory interface module—an uncore module—with a ring configuration to interconnect multiple cores. Processor 200 is illustrated including a physically distributed cache; a ring interconnect; as well as core, cache, and memory controller components. However, this depiction is purely illustrative, as a processor implementing the described methods and apparatus may include any processing elements, style or level of cache, and/or memory, front-side-bus or other interface to communicate with external devices.

Figure 2:
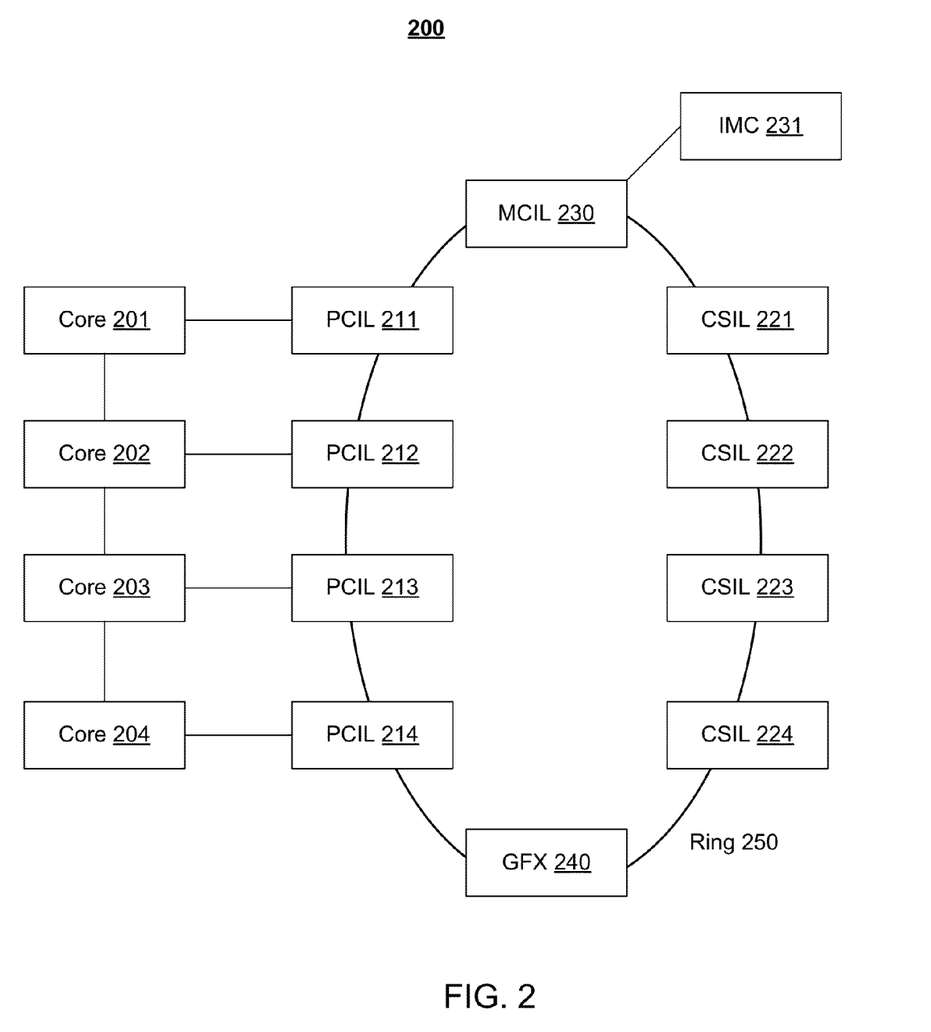
FIG. 2 illustrates on-core memory interface logic according to an embodiment.

In one embodiment, caching agents 221-224 are each to manage a slice of a physically distributed cache. As an example, each cache component, such as component 221, is to manage a slice of a cache for a co-located core—a core the cache agent is associated with for purpose of managing the distributed slice of the cache. As depicted, cache agents 221-224 are referred to as Cache Slice Interface Logic (CSIL)s; they may also be referred to as cache components, agents, or other known logic, units, or modules for interfacing with a cache or slice thereof. Note that the cache may be any level of cache; yet, for this exemplary embodiment, discussion focuses on a last-level cache (LLC) shared by cores 201-204.

Much like cache agents handle traffic on ring interconnect 250 and interface with cache slices, core agents/components 211-214 are to handle traffic and interface with cores 201-204, respectively. As depicted, core agents 221-224 are referred to as Processor Core Interface Logic (PCIL)s; they may also be referred to as core components, agents, or other known logic, units, or modules for interfacing with a processing element Additionally, ring 250 is shown as including Memory Controller Interface Logic (MCIL) 230 and Graphics Hub (GFX) 240 to interface with other modules, such as memory controller (IMC) 231 and a graphics processor (not illustrated). However, ring 250 may include or omit any of the aforementioned modules, as well as include other known processor modules that are not illustrated. Additionally, similar modules may be connected through other known interconnects, such as a point-to-point interconnect or a multi-drop interconnect.

It's important to note that the methods and apparatus' described herein may be implemented in any cache at any cache level, or at any processor or processor level. Furthermore, caches may be organized in any fashion, such as being a physically or logically, centralized or distributed cache.

Figure 3:
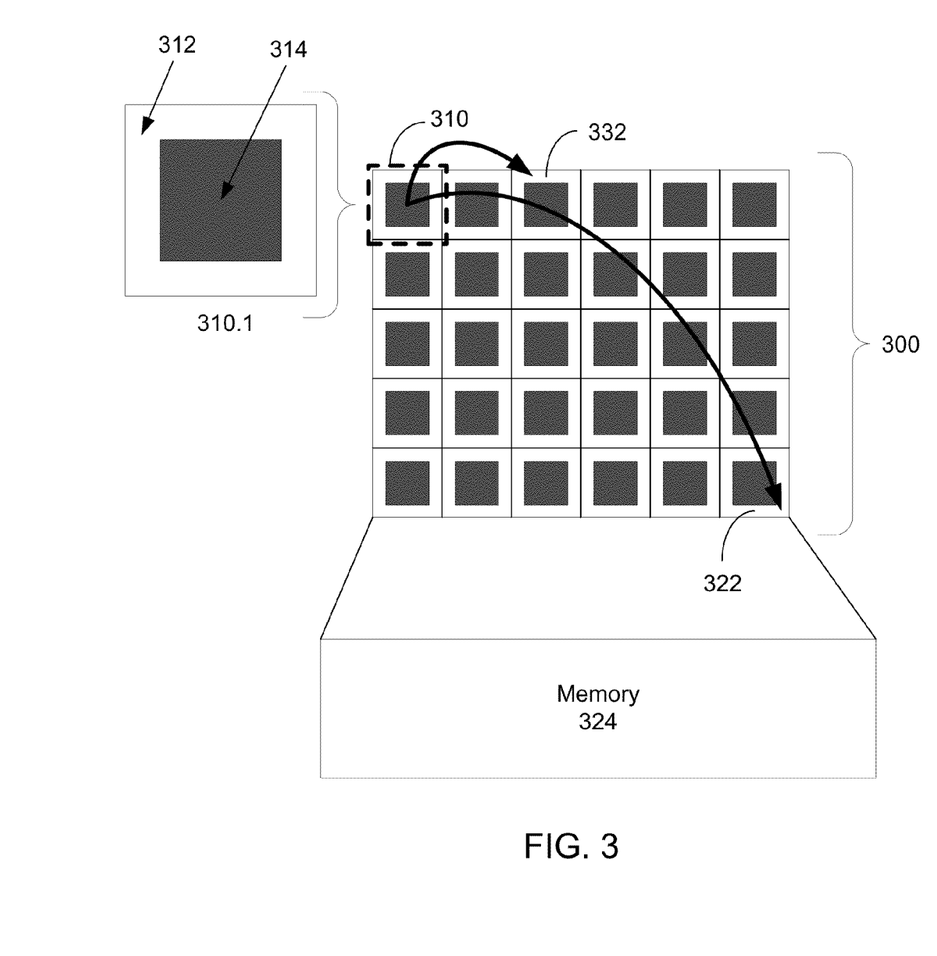
FIG. 3 illustrates a chip multiprocessor (CMP) according to an embodiment.

FIG. 3 illustrates a chip multiprocessor (CMP) 300 according to an embodiment. As discussed above, a computer processor may include multiple cores. Manufacturers typically integrate the cores onto a single integrated circuit die known as a chip multiprocessor or CMP, or onto multiple dies in a single package. For example, CMP 300 may include 6×5=30 cores. A magnified view 310.1 of a single core and its co-located cache 310 is shown for illustration purposes. The magnified view 310.1 shows the core 314 and its respective co-located cache 312.

Traditional CMP architectures incorporate a shared and distributed cache structure. The contiguous address space from memory 324 (for example, RAM), is mapped across the cache slices of the CMP 300. Specifically, each memory address from memory 324 may be mapped to a cache slice of CMP 300 through a hash function. When data is retrieved and stored into a memory address, that data may be cached in the cache slice corresponding to that memory address. Typically, the hash function will attempt to distribute the memory addresses of memory 324 evenly across the cache slices of CMP 300. Therefore, when data is retrieved for processing, that data may be cached in any of the cache slices on CMP 300. All cores have access to all cache slices on CMP 300. Thus, the time required by a core to access data depends on the distance between the core and the location of the cache slice where the data resides. For example, it will take a process/thread executing on core 314 longer to access data from cache slice 322 than cache slice 332 since cache slice 322 is physically located farther away from core 314 than cache slice 332. Consequently, as the number of cores on a CMP increase, the average distance between cores and cache slices increases, which results in higher latency during cache access.

Figure 4:
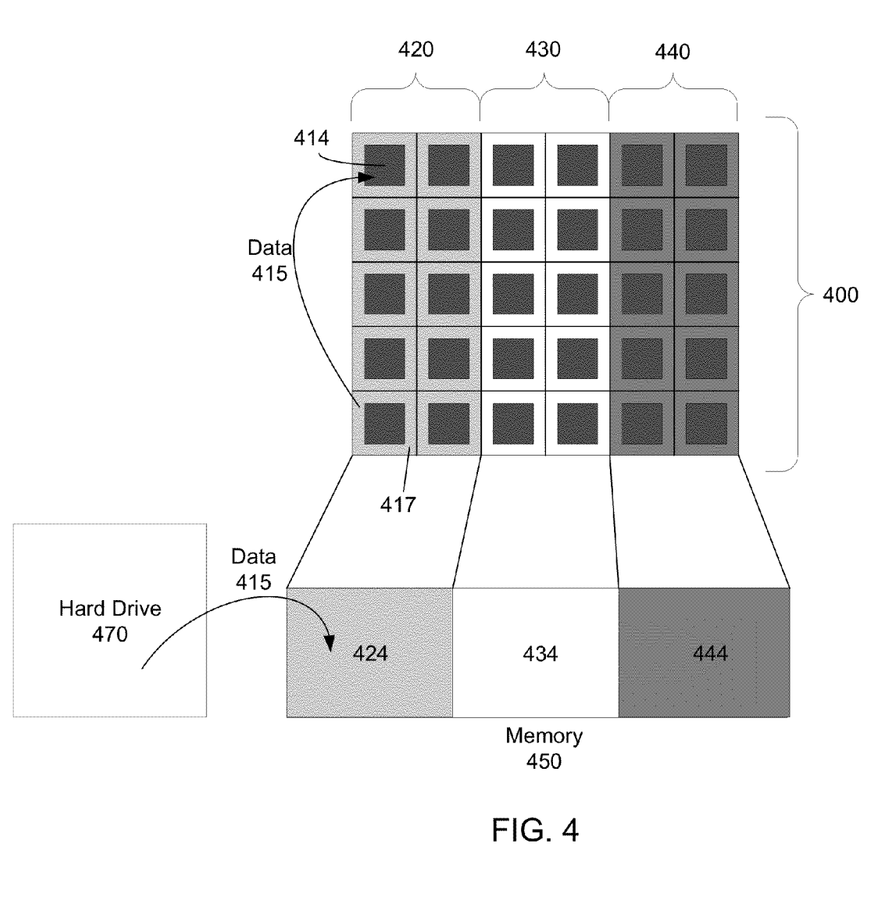
FIG. 4 illustrates a CMP according to an embodiment.

FIG. 4 illustrates a CMP 400 according to an embodiment. The CMP 400 is logically separated into three clusters 420, 430 and 440, called sub-NUMA clusters (SNCs). Each SNC is a cluster of adjacent cores and the co-located cache slices grouped together. In an embodiment, the cache slices may be part of a last level cache (LLC), i.e., the last cache in the memory hierarchy on a processor, such as a second or third level cache. The memory 450 is soft partitioned into sub-NUMA address regions (SNARs) 424, 434, and 444 which are associated with the SNCs 420, 430 and 440 respectively. Each SNAR may be a contiguous portion of memory which is mapped to the cache slices of a corresponding SNC. The contiguous portion of memory may be physically and/or logically contiguous. For example, the addresses of SNAR 424 may be evenly hashed to the cache slices of SNC 420. Cache accesses of a core in a particular SNC may be biased to the SNAR associated with that particular SNC. In other words, when a core from a particular SNC requires data, that data may be stored in the SNAR associated with that particular SNC. For example, cache accesses of core 414 may be biased to SNAR 424. In an embodiment, such biasing may be implemented by making SNCs visible to an operating system as NUMA nodes.

In an embodiment, an SNC may be made visible to the operating system (OS) of the computer system through the basic input/output system (BIOS) as a NUMA node with the respective associated SNAR as the SNC's assigned memory address space. Peer SNCs within a CMP may be advertised as the most-adjacent NUMA nodes through mechanisms such as advanced configuration and power interface (ACPI) system locality distance information table (SLIT) used by operating systems such as LINUX. In an embodiment, the Windows operating system may detect NUMA adjacency through existing NUMA latency measurement scheme on remote NUMA nodes.

In an example embodiment, a process executed on core 414 may require data 415. The first access of the data 415 may require retrieval of the data from a storage device such as a hard drive 470. Upon retrieval of the data 415 from the hard drive 450, the operating system may store it to the memory 450 in SNAR 424 since the core 414 requesting the data 415 is located in the SNC 420 associated with SNAR 424. Given that the addresses of SNAR 424 are hashed to the cache slices of SNC 420, the data 215 may be available in the cache slice(s) of SNC 420 for future requests. Partitioning a CMP into SNCs and the memory into associated SNARs may decrease the cache latency since data required by a core will likely reside in a cache slice local to the core's SNC. In an embodiment, if the OS is unable to store data 415 in SNAR 424, for example, because SNAR 424 is full, the OS may allocate the data 415 to SNAR 434, since SNAR 434 is associated with SNC 430, the SNC closest to SNC 420.

Although FIG. 4 illustrates a CMP 400 which is separated into three SNCs with 10 cores each for ease of discussion, in other embodiments, the number of cores may vary from cluster to cluster and a CMP may include any number of clusters. Similarly, there does not have to be a one-to-one correspondence between the SNARs and the SNCs. In an embodiment, one or more SNCs may correspond to a single SNAR. In an embodiment, a single SNC may correspond to one or more SNARs.

Figure 5:
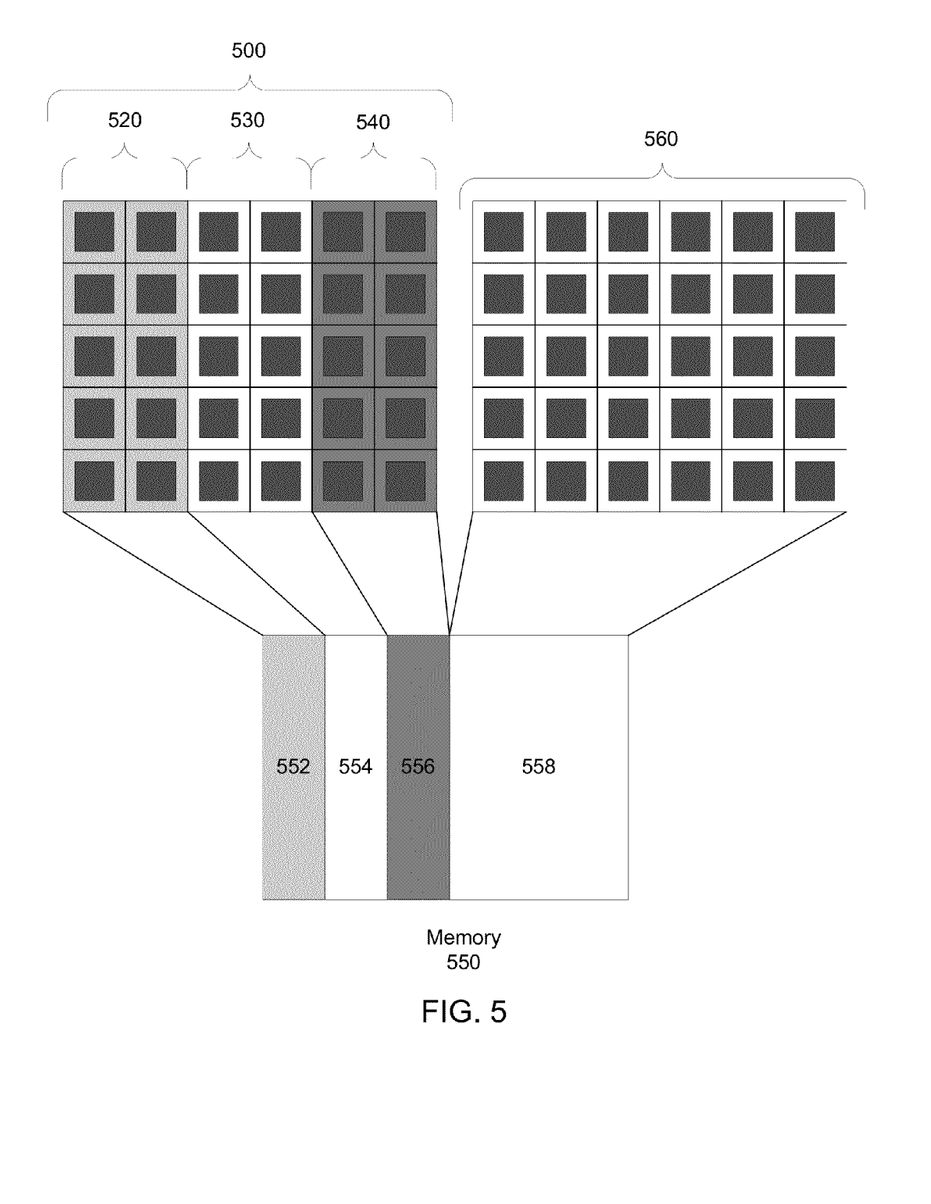
FIG. 5 illustrates multiple CMPs according to an embodiment.

FIG. 5 illustrates multiple CMPs according to an embodiment. Clustered CMPs with SNCs can operate concurrently with non-clustered CMPs. In an example embodiment, CMP 500 may be divided into three SNCs 520, 530, and 540. CMP 560 may be a non-clustered CMP. Memory 550 may be soft partitioned such that three contiguous partitions (SNARs) 552, 554, and 556 are mapped (for example, uniformly hashed) across the cache slices in SNCs 520, 530, and 540 respectively. A fourth partition of the memory 558 may be mapped across all cache slices in CMP 560. The four partitions of memory 550 do not necessarily have to be the same size. For example, partition 558 may include half of the memory addresses of the memory 550, and partitions 552, 554, and 556, may include the other half.

In an embodiment, cache accesses of a core in a particular SNC may be biased to the SNAR associated with that particular SNC. In other words, when a core from a particular SNC (e.g., SNC 520) requires data, that data may be stored in the SNAR associated with that particular SNC (e.g., SNAR 552). In an embodiment, the cores from one CMP may also have access to the data in another CMP and/or the associated memory addresses mapped to the other CMP. Namely, the cores of CMP 500 may access the cache slices of CMP 560 and/or the memory addresses mapped to CMP 560 (memory partition 558), and vice-versa. For example, if one of the cores in SNC 520 requires data which is stored in a memory address mapped to CMP 560 (i.e., memory partition 558), the data may be retrieved from the memory partition 558 or the cache slice in CMP 560 mapped to that particular memory address, and the retrieved data may be cached according to a caching algorithm (for example, even hashing) in CMP 500. Operating clustered CMPs concurrently with non-clustered CMPs may decrease cache latency for data accesses in the clustered CMPs while ensuring backwards compatibility.

Figure 6:
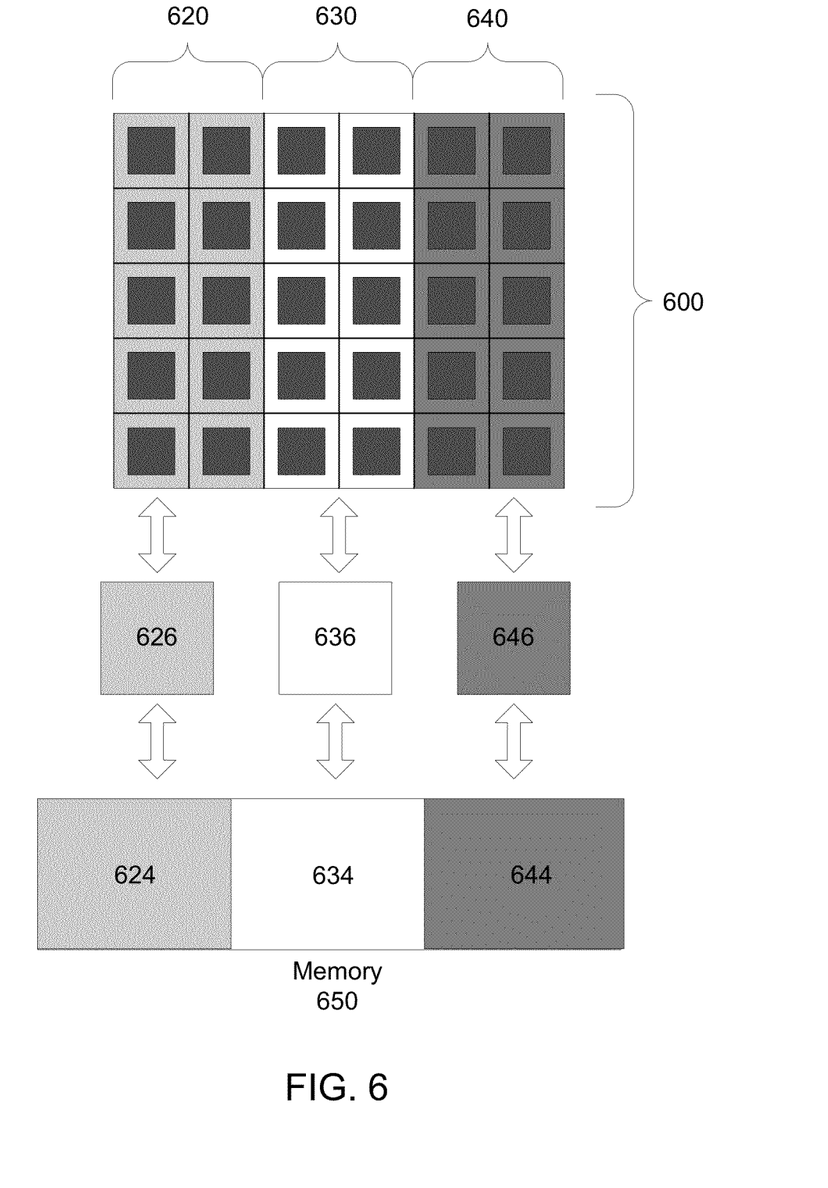
FIG. 6 illustrates a CMP and memory controllers according to an embodiment.

FIG. 6 illustrates a CMP 600 and memory controllers according to an embodiment. Memory controllers 626, 636, and 646 are digital circuits which manage the flow of data going to and from the main memory 650. A memory controller can be part of a separate chip or integrated into another chip, such as on the die of a microprocessor. In an embodiment, the CMP 600 is logically separated into three SNCs 620, 630 and 640. The memory 650 corresponding to CMP 600 is soft partitioned into SNARs 624, 634, and 644 which are associated with the SNCs 620, 630 and 640 respectively. In an embodiment, the memory controllers 626, 636, and 646 may be assigned to particular SNAR(s). In an embodiment, each memory controller may be assigned to the SNAR physically closest to that memory controller. For example, memory controllers 626, 636, and 646 may be assigned to SNARs 624, 634, and 644 respectively. In an embodiment, one or more of the memory controllers 626, 636, and 646 may be located on CMP 600.

In an embodiment, each memory controller controls the data flow to and from its assigned SNAR. Therefore, memory controller 626 may control data flow to and from SNAR 624; memory controller 636 may control data flow to and from SNAR 634; and memory controller 646 may control data flow to and from SNAR 644. Since each memory controller controls the data flow to and from the SNAR physically closest to the memory controller, the latency resulting from the data transfer between memory 650 and the memory controllers may be minimized.

Although FIG. 6 illustrates a one-to-one correspondence between the memory controllers and the SNARs for ease of discussion, in an embodiment, one or more memory controllers may be assigned to a single SNAR based on the physical proximity between the memory controller(s) and the SNAR. In another embodiment, a single memory controller may be assigned to one or more SNARs based on the physical proximity between the memory controller and the SNAR(s).

Figure 7:
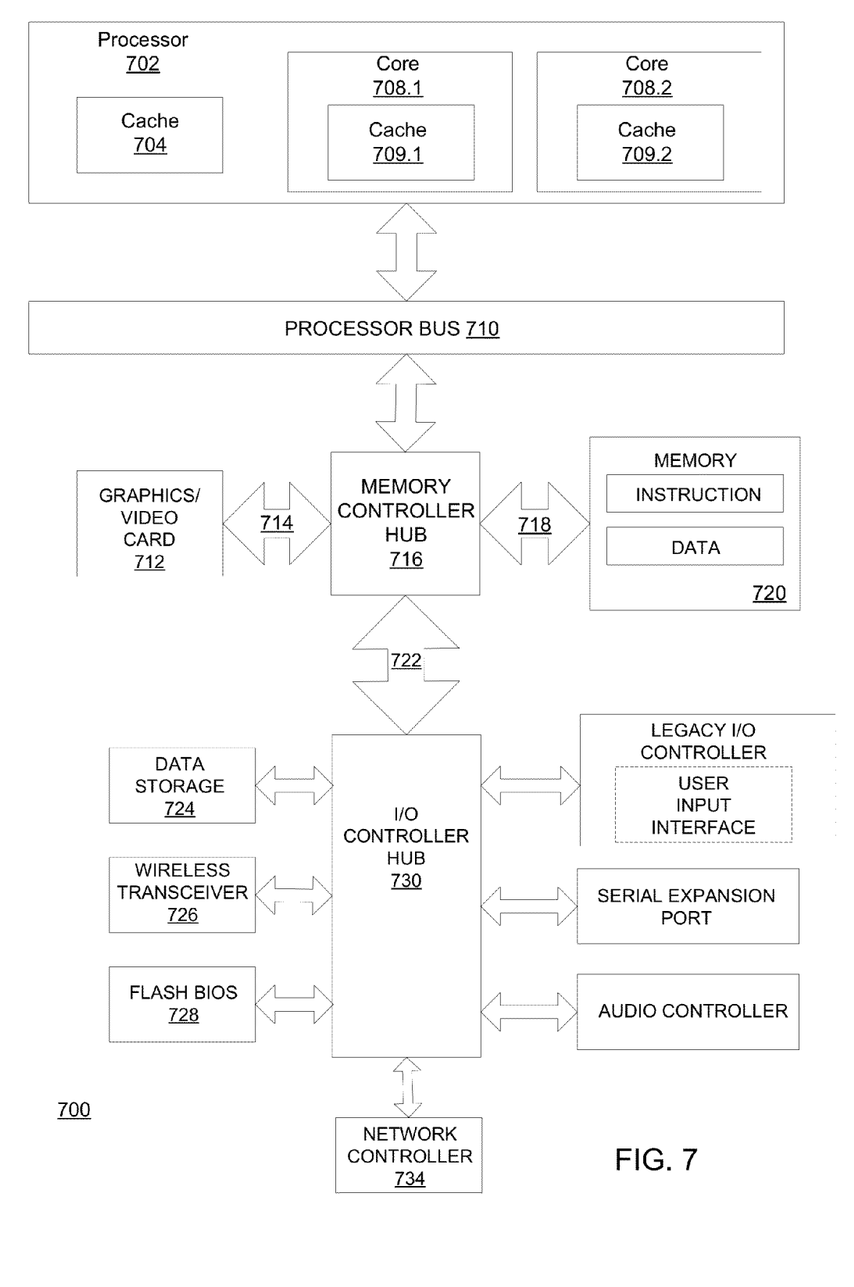
FIG. 7 is a block diagram of an exemplary computer system according to an embodiment.

FIG. 7 is a block diagram of an exemplary computer system 700 formed with a processor 702 that includes one or more cores 708 (e.g., cores 708.1 and 708.2). Each core 708 may execute an instruction in accordance with one embodiment of the present invention. System 700 includes a component, such as a processor 702 to employ execution units including logic to perform algorithms for process data, in accordance with the present invention. System 700 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 700 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment of the system 700 may be described in the context of a single processor desktop or server system, but alternative embodiments can be included in a multiprocessor system. System 700 may be an example of a 'hub' system architecture. The computer system 700 includes a processor 702 to process data signals. The processor 702 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 702 is coupled to a processor bus 710 that can transmit data signals between the processor 702 and other components in the system 700. The elements of system 700 perform their conventional functions that are well known to those familiar with the art.

Depending on the architecture, the processor 702 can have a single internal cache or multiple levels of internal cache. Alternatively, in another embodiment, the cache memory can reside external to the processor 702. Other embodiments can also include a combination of both internal and external caches depending on the particular implementation and needs. In one embodiment, the processor 702 may include a Level 2 (L2) internal cache memory 704 and each core (e.g., 708.1 and 708.2) may include a Level 1 (L1) cache (e.g., 709.1 and 709.2, respectively). In one embodiment, the processor 702 may be implemented in one or more semiconductor chips. When implemented in one chip, all or some of the processor 702's components may be integrated in one semiconductor die.

Each of the core 708.1 and 708.2 may also include respective register files (not shown) that can store different types of data in various registers including integer registers, floating point registers, status registers, and instruction pointer register. Each core 708 may further include logic to perform integer and floating point operations.

The processor 702 also includes a microcode (ucode) ROM that stores microcode for certain macroinstructions. For one embodiment, each core 708 may include logic to handle a packed instruction set (not shown). By including the packed instruction set in the instruction set of a general-purpose processor 702, along with associated circuitry to execute the instructions, the operations used by many multimedia applications may be performed using packed data in a general-purpose processor 702. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of the processor 702 can also be used in micro controllers, embedded processors, graphics devices, DSPs, and other types of logic circuits. System 700 includes a memory 720. Memory 720 can be a dynamic random access memory (DRAM) device, a static random access memory (SRAM) device, flash memory device, or other memory device. Memory 720 can store instructions and/or data represented by data signals that can be executed by the processor 702.

A system logic chip 716 is coupled to the processor bus 710 and memory 720. The system logic chip 716 in the illustrated embodiment is a memory controller hub (MCH). The processor 702 can communicate to the MCH 716 via a processor bus 710. The MCH 716 provides a high bandwidth memory path 718 to memory 720 for instruction and data storage and for storage of graphics commands, data and textures. The MCH 716 is to direct data signals between the processor 702, memory 720, and other components in the system 700 and to bridge the data signals between processor bus 710, memory 720, and system I/O 722. In some embodiments, the system logic chip 716 can provide a graphics port for coupling to a graphics controller 712. The MCH 716 is coupled to memory 720 through a memory interface 718. The graphics card 712 may be coupled to the MCH 716 through an Accelerated Graphics Port (AGP) interconnect 714.

System 700 uses a proprietary hub interface bus 722 to couple the MCH 716 to the I/O controller hub (ICH) 730. The ICH 730 provides direct connections to some I/O devices via a local I/O bus. The local I/O bus is a high-speed I/O bus for connecting peripherals to the memory 720, chipset, and processor 702. Some examples are the audio controller, firmware hub (flash BIOS) 728, wireless transceiver 726, data storage 724, legacy I/O controller containing user input and keyboard interfaces, a serial expansion port such as Universal Serial Bus (USB), and a network controller 734. The data storage device 724 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

A value, as used herein, includes any known representation of a number, a state, a logical state, or a binary logical state. Often, the use of logic levels, logic values, or logical values is also referred to as 0s and 0s, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

The embodiments of methods, hardware, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical storage device, optical storage devices, acoustical storage devices or other form of propagated signal (e.g., carrier waves, infrared signals, digital signals) storage device; etc. For example, a machine may access a storage device through receiving a propagated signal, such as a carrier wave, from a medium capable of holding the information to be transmitted on the propagated signal.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method comprising:
   grouping a plurality of cores of a processor and a plurality of cache slices co-located with the plurality of cores into a first cluster among a plurality of clusters;
   partitioning a memory space into a plurality of address regions;
   associating each of the plurality of the clusters with a corresponding address region of the plurality of address regions, wherein each memory address of each address region is mapped to at least one of the plurality of cache slices grouped into each of the plurality of the clusters; and
   biasing a cache access from one or more of the plurality of cores grouped into the plurality of the clusters based on the address regions corresponding to the clusters, such that the cache access is performed on a selected one of the address regions selected based on which cluster the cache access came from.

2. The method of claim 1, further comprising: storing data required by a core grouped into the first cluster in the address region associated with the first cluster.

3. The method of claim 1, further comprising: storing data required by a core grouped into the first cluster in an address region associated with a second cluster, wherein the second cluster is a cluster physically closest to the first cluster.

4. The method of claim 1, wherein the address region associated with the first cluster includes a contiguous block of memory space.

5. The method of claim 1, wherein the each memory address of the address region associated with the first cluster is evenly hashed across the plurality of cache slices grouped into the first cluster.

6. The method of claim 1, wherein the first cluster is visible to an operating system as a NUMA node.

7. The method of claim 1, further comprising: assigning at least one memory controller to the address region associated with the first cluster, wherein the at least one memory controller assigned to the address region associated with the first cluster manages data flow to and from the address region associated with the first cluster.

8. The method of claim 7, wherein the at least one memory controller includes a memory controller physically closest to the address region associated with the first cluster.

9. An apparatus comprising:
a processor to execute computer instructions, wherein a plurality of cores of the processor and a plurality of cache slices co-located with the plurality of cores are grouped into a first cluster among a plurality of clusters, and the processor is configured to:
partition a memory space into a plurality of address regions,
associate each of the plurality of the clusters with a corresponding address region of the plurality of address regions, wherein each memory address of each address region is mapped to at least one of the plurality of cache slices grouped into each of the plurality of the clusters, and
bias a cache access from one or more of the plurality of cores grouped into the plurality of the clusters based on the address regions corresponding to the clusters, such that the cache access is performed on a selected one of the address regions selected based on which cluster the cache access came from.

10. The apparatus of claim 9, wherein the processor is further configured to store data required by a core grouped into the first cluster in the address region associated with the first cluster.

11. The apparatus of claim 9, wherein the processor is further configured to store data required by a core grouped into the first cluster in an address region associated with a second cluster, wherein the second cluster is a cluster physically closest to the first cluster.

12. The apparatus of claim 9, wherein the address region associated with the first cluster includes a contiguous block of memory space.

13. The apparatus of claim 9, wherein the each memory address of the address region associated with the first cluster is evenly hashed across the plurality of cache slices grouped into the first cluster.

14. The apparatus of claim 9, wherein the first cluster is visible to an operating system as a NUMA node.

15. The apparatus of claim 9, wherein the processor is further configured to assign at least one memory controller to the address region associated with the first cluster, wherein the at least one memory controller assigned to the address region associated with the first cluster manages data flow to and from the address region associated with the first cluster.

16. The apparatus of claim 15, wherein the at least one memory controller includes a memory controller physically closest to the address region associated with the first cluster.

17. An apparatus comprising:
a processor to execute computer instructions, wherein a plurality of cores of the processor and a plurality of cache slices co-located with the plurality of cores are grouped into a first cluster among a plurality of clusters; and
a memory,
wherein the memory is partitioned into a plurality of address regions,
each of the plurality of the clusters is associated with a corresponding address region of the plurality of address regions, each memory address of each address region is mapped to at least one of the plurality of cache slices grouped into each of the plurality of the clusters, and
a cache access from one or more of the plurality of cores grouped into the plurality of the clusters is biased based on the address regions corresponding to the clusters, such that the cache access is performed on a selected one of the address regions selected based on which cluster the cache access came from.

18. The apparatus of claim 17, wherein data required by a core grouped into the first cluster is stored in the address region associated with the first cluster.

19. The apparatus of claim 17, wherein data required by a core grouped into the first cluster is stored in an address region associated with a second cluster, wherein the second cluster is a cluster physically closest to the first cluster.

20. The apparatus of claim 17, wherein the address region associated with the first cluster includes a contiguous block of memory space.

21. The apparatus of claim 17, wherein the each memory address of the address region associated with the first cluster is evenly hashed across the plurality of cache slices grouped into the first cluster.

22. The apparatus of claim 17, wherein the first cluster is visible to an operating system as a NUMA node.

23. The apparatus of claim 17, further comprising: at least one memory controller assigned to the address region associated with the first cluster, wherein the at least one memory controller manages data flow to and from the address region associated with the first cluster.

24. The apparatus of claim 23, wherein the at least one memory controller includes a memory controller physically closest to the address region associated with the first cluster.

25. A non-transitory machine-readable medium having stored thereon an instruction, which if performed by a machine causes the machine to perform a method comprising:
grouping a plurality of cores of a processor and a plurality of cache slices co-located with the plurality of cores into a first cluster among a plurality of clusters;
partitioning a memory space into a plurality of address regions;
associating each of the plurality of the clusters with a corresponding address region of the plurality of address regions, wherein each memory address of each address region is mapped to at least one of the plurality of cache slices grouped into each of the plurality of the clusters; and biasing a cache access from one or more of the plurality of cores grouped into the plurality of the clusters based on the address regions corresponding to the clusters, such that the cache access is performed on a selected one of the address regions selected based on which cluster the cache access came from.

26. The machine-readable medium of claim 25, the method further comprising: storing data required by a core grouped into the first cluster in the address region associated with the first cluster.

27. The machine-readable medium of claim 25, the method further comprising: storing data required by a core grouped into the first cluster in an address region associated with a second cluster, wherein the second cluster is a cluster physically closest to the first cluster.

28. The machine-readable medium of claim 25, wherein the address region associated with the first cluster includes a contiguous block of memory space.

29. The machine-readable medium of claim 25, wherein the each memory address of the address region associated with the first cluster is evenly hashed across the plurality of cache slices grouped into the first cluster.

30. The machine-readable medium of claim 25, wherein the first cluster is visible to an operating system as a NUMA node.

31. The machine-readable medium of claim 25, the method further comprising: assigning at least one memory controller to the address region associated with the first cluster, wherein the at least one memory controller assigned to the address region associated with the first cluster manages data flow to and from the address region associated with the first cluster.

32. The machine-readable medium of claim 31, wherein the at least one memory controller includes a memory controller physically closest to the address region associated with the first cluster.

* * * * *